Oct. 12, 1937.  O. F. LUNDELIUS ET AL  2,095,566
STEERING MECHANISM
Filed Feb. 23, 1934   3 Sheets—Sheet 1
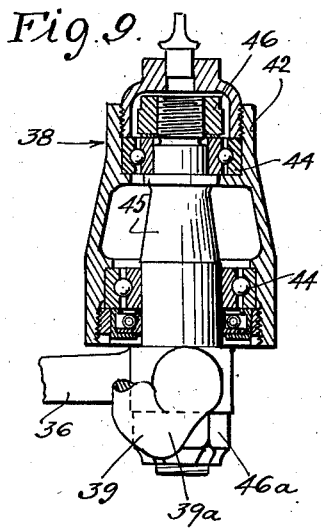
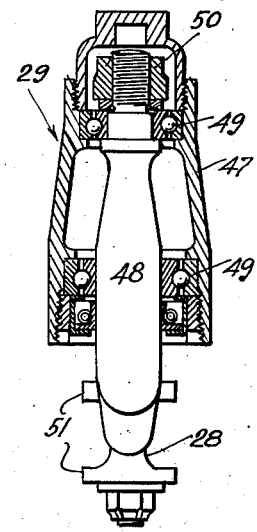
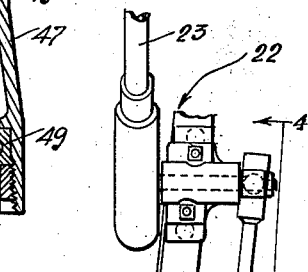
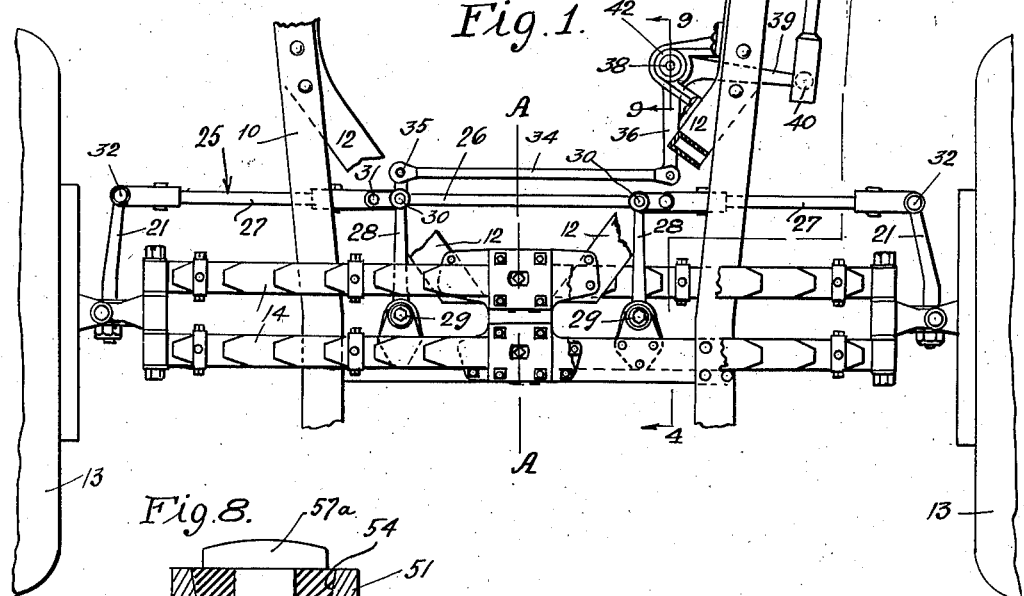
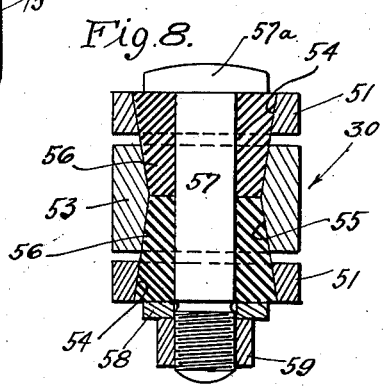
Inventor.
Oscar F. Lundelius
Melvin N. Lefler.
Attorney.

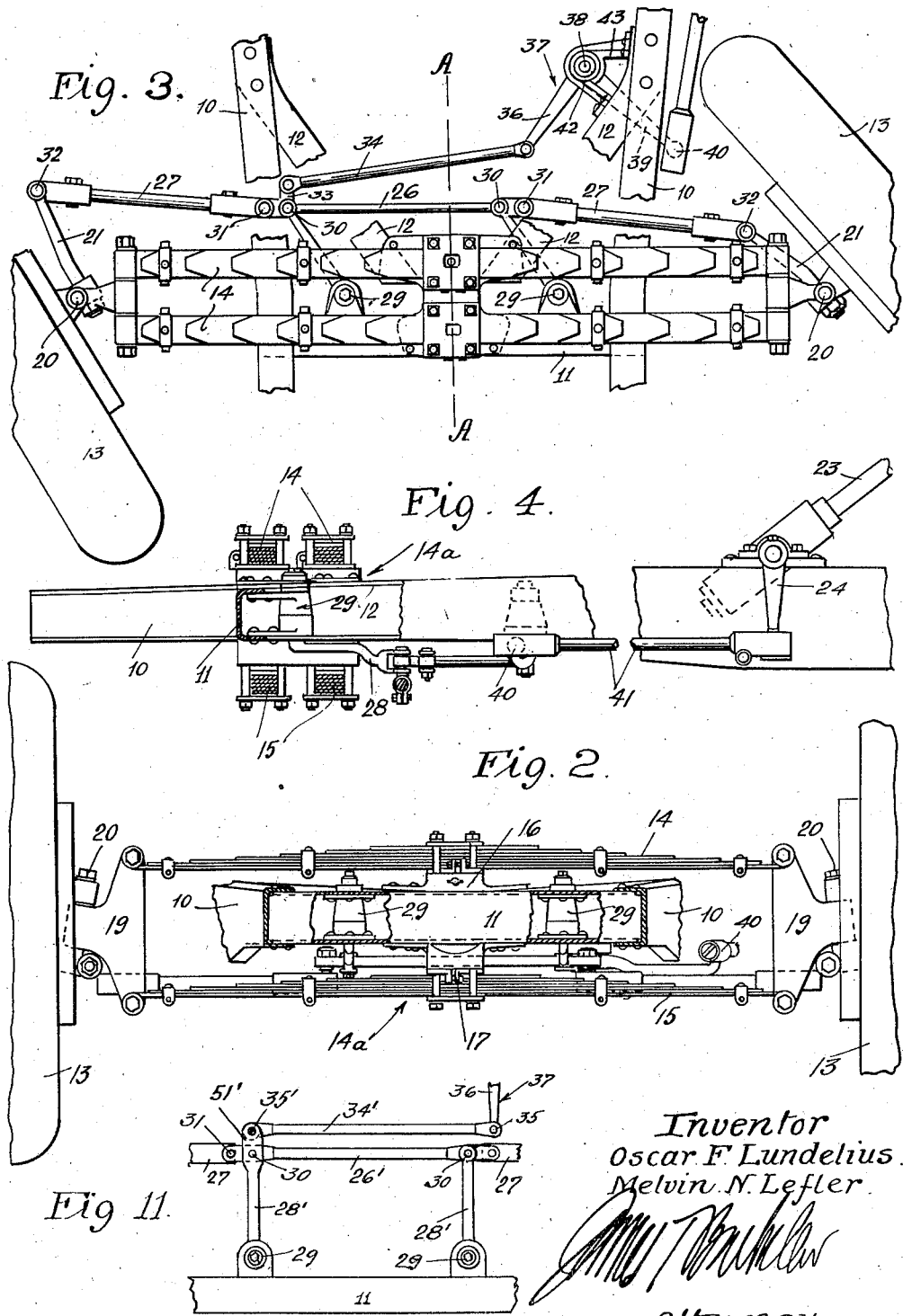

Oct. 12, 1937.  O. F. LUNDELIUS ET AL  2,095,566
STEERING MECHANISM
Filed Feb. 23, 1934  3 Sheets—Sheet 3
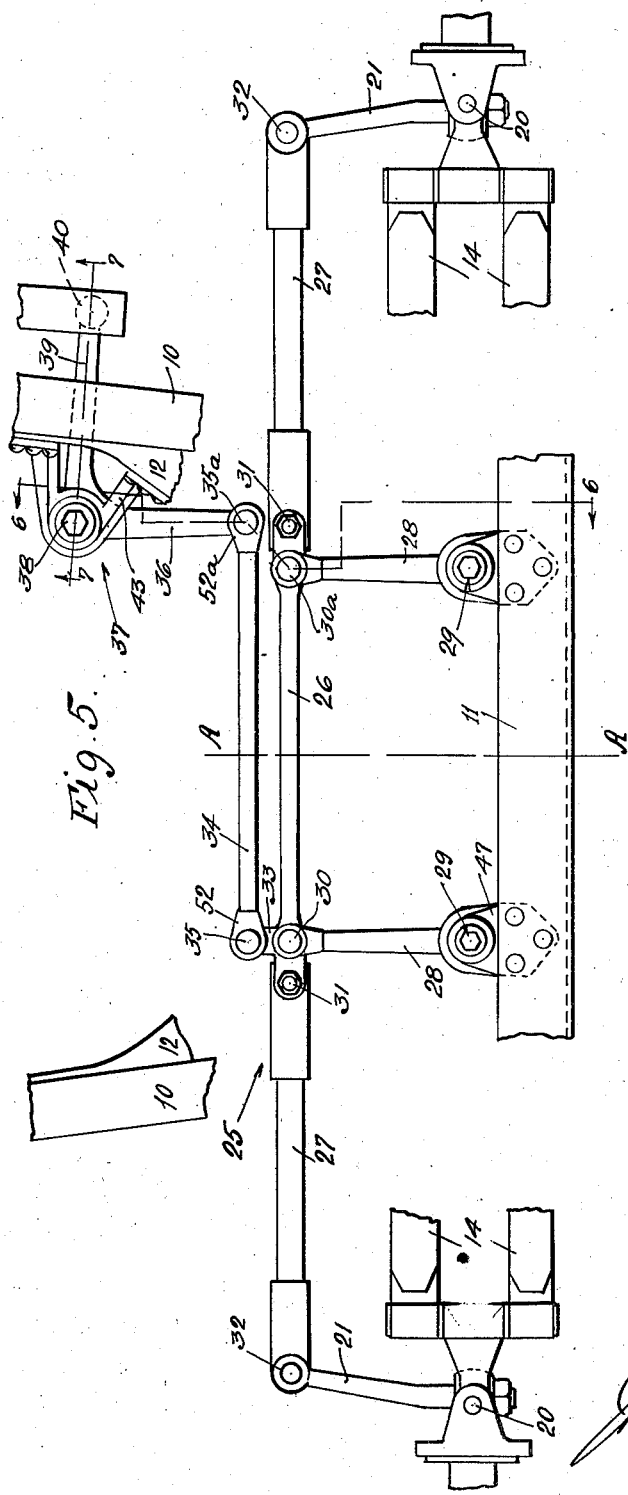
Inventor
Oscar F. Lundelius
Melvin N. Lefler.
Attorney.

Patented Oct. 12, 1937

2,095,566

UNITED STATES PATENT OFFICE 2,095,566

STEERING MECHANISM

Oscar F. Lundelius and Melvin N. Lefler, Los Angeles, Calif., assignors to Lundelius & Eccleston Motors Corporation, Los Angeles, Calif., a corporation of Delaware Application February 23, 1934, Serial No. 712,502

9 Claims. (Cl. 280—95)

This invention has to do with steering mechanisms for vehicles. While it is not limited to embodiment with vehicles having any particular spring or suspension system, it is particularly well adapted for application to vehicles wherein the wheels are laterally spaced and connected to the vehicle body directly by the spring system rather than through rigid axles. Therefore, we will describe our steering mechanism in connection with that type of suspension system, though this is not to be considered as limitative on the claims, except insofar as certain of the claims may be specifically directed thereto.

In Patent No. 1,737,856, issued jointly to us on December 3, 1929, and entitled Steering mechanism for spring supported vehicles, we have disclosed a steering gear in which there is employed a jointed tie rod interconnecting the dirigible wheels of the vehicle and including a transversely movable block member confined by a housing to a straight-line path of travel, tie rod sections extending from opposite ends of this member into connection with the steering knuckle arms of the dirigible wheels. The end tie rod sections have universal joint connection with the central, sliding block and with the knuckle arms, so as to be capable of independent vertical oscillatory movement. The drag link from the steering arm is applied to a drag link arm extending from one of the steering knuckles, steering movement thus being applied directly to one knuckle and its wheel and being transmitted through the jointed tie rod to the other knuckle and its wheel.

In our copending application, Ser. No. 657,372, filed February 18, 1933 on Steering mechanism, we have disclosed another steering mechanism of the same general type as regards the tie rod construction and mounting, but in that application we have disclosed a horizontally swinging steering crank between the usual steering arm and tie rod. A drag link extends from steering arm to the crank, while a connecting rod extends from the crank to the central, sliding section of the tie rod, rather than to the steering knuckle as in the patent.

The present application is directed to steering mechanism of the general type set forth in said patent and copending application, embracing the advantageous features of both, but additionally presenting features of improvement over the previous disclosures.

Here the central section of the tie rod, rather than being confined for horizontal sliding movement through a housing, is supported for horizontal swinging movement by a parallel link system, all complications incident to the provision of a sliding block thus being eliminated, and full advantage being taken of the inherent benefits arising from a parallel link system. The arrangement is such that movement of the central section transversely of the longitudinal axis of the vehicle during steering movement, does not upset the desired geometrical relationship between steering knuckles, an accomplishment which, so far as we are aware, has not previously been accomplished in a structure wherein a jointed tie rod is supported for swinging movement of its central member, as distinguished from confined, sliding movement of that member.

The arrangement is such that road shocks are absorbed or dissipated before they reach the steering post, thus materially reducing the strain of the driver. Furthermore, wheel "shimmy" is reduced to a minimum and much of the wear on steering column gears, bushings, etc., is eliminated.

Other features of novelty and advantage will appear from the following detailed description, reference being had to the accompanying drawings, in which:

Fig. 1 is a fragmentary plan view of the forward end of a vehicle chassis of the transverse-spring-supported type, with our improved steering mechanism applied thereto;

Fig. 2 is a front elevation of the mechanism as shown in Fig. 1, with certain parts of the frame broken away and shown in section better to illustrate certain structural features;

Fig. 3 is a view similar to Fig. 1 but showing the steering gear as having been operated to shift the dirigible wheels;

Fig. 4 is a section on line 4—4 of Fig. 1;

Fig. 5 is an enlarged plan view of the steering mechanism as illustrated in Fig. 1, but with much of the frame work and spring suspension system broken away;

Fig. 6 is a section on line 6—6 of Fig. 5;

Fig. 7 is a section on line 7—7 of Fig. 5;

Fig. 8 is an enlarged section on line 8—8 of Fig. 6;

Fig. 9 is an enlarged section on line 9—9 of Fig. 1 but showing the crank at the lower end of the spindle in fragmentary elevation; and Fig. 10 is an enlarged section on line 10—10 of Fig. 6;

Fig. 11 is a fragmentary plan view showing a variational connection between tie rod and connecting rod.

As stated at the outset, the invention in its broader aspects may be applied to a vehicle having any suitable frame construction and spring arrangement, but it is particularly well adapted for application to a frame and spring structure of a particular type such, for instance, as that disclosed in the aforementioned patent, and in Patent No. 1,886,963, granted November 8, 1932 to Oscar F. Lundelius and John R. Dillon on Steering gear. Accordingly, we shall proceed first to describe that particular frame and spring structure as illustrative of a base structure upon which our improved steering mechanism may be applied, though this is not intended to be limitative on the broader aspects of the invention. The steering mechanism is particularly well adapted for embodiment with the illustrated type of frame and spring structures because it especially well meets the difficulties encountered in connection with systems where there is a wide range of individual wheel deflection under varying road conditions.

Longitudinally extending side rails 10, preferably of channel cross section with the flanges facing inwardly, are connected by cross frame member 11, likewise of channel cross section but with flanges facing rearwardly, braces 12 extending angularly from rails 10 to cross member 11. Dirigible wheels 13 are connected to the frame through the spring suspension system generally indicated at 14a, the upper and lower pairs 14 and 15, respectively, of springs being clamped to cross member 11 through mountings 16 and 17 respectively, these mountings being located in the longitudinal axial plane A—A of the vehicle frame.

The ends of springs 14 and 15 are pivotally connected to wheel carriers 19 which, in turn, support knuckle pins 20 upon which wheels 13 are mounted for steering movement. Steering knuckle arms 21 extend rearwardly and inwardly as clearly illustrated in Fig. 5 and take the improved tie rod in a manner later to be described.

Spaced rearwardly from spring-system 14a and mounted on one of the rails 10, is a usual steering gear system conventionally illustrated at 22, the steering post being indicated at 23 and the vertically swinging steering arm at 24.

Our improved steering mechanism will now be described, and for purposes of description, said mechanism will be considered as in "normal" position both as to the system as a whole and as to the individual parts thereof, when dirigible wheels 13 are in the positions of Figs. 1, 2 and 5, that is, when they are parallel to axis A—A.

A jointed tie rod is generally indicated at 25, this rod being made up of central section 26 and duplicate end sections 27. Central section 26 is mounted for horizontal swinging movement transversely of the vehicle frame through the medium of supporting arms or links 28 which are pivotally connected at their forward ends to cross member 11 through bearings generally indicated at 29 and which will later be described in detail. Supporting arms or links 28 are of equal effective length and normally extend in parallelism with axis A—A. Their pivotal connections with section 26 are generally indicated at 30, these connections being spaced slightly in from the ends of section 26. The preferred type of pivotal connection will be later set forth.

End sections 27 have universal joint connection 31 with the opposite ends of section 26, while the outer ends of sections 27 have universal joint connection 32 with knuckle arms 21. Sections 27 are of such length and disposition and universal joints 31 are so located with relation to spring system 14a that said sections, when the wheels move vertically under varying road conditions, swing vertically in substantial parallelism with the flexing springs and remain in such relationship with the spring-and-wheel system as not to cause interference between that system and the steering system. It is thus assured that bodily vertical movement of the wheels does not unduly strain the steering mechanism or transmit movement back through such mechanism to the steering wheel, all to obvious advantage.

Rod section 26 has a rearward or transverse extension 33 to which a connecting rod 34 is pivotally connected at 35, pivot 35 preferably being so located that it is directly in line with pivotal connections 29 and 30 of that supporting arm 28 which lies to the left of axis A—A (as viewed in Fig. 5) when that supporting arm is in normal position. Connecting rod 34 normally extends in parallel relation with rod 26 and preferably to a point a little beyond the supporting arm 28 at the right of axis A—A. At 35a rod 34 is pivotally connected to arm 36 of the steering crank generally indicated at 37, the latter being pivotally supported at 38 from one of the frame members 10. Crank arm 36 normally extends parallel with axis A—A and hence with arms 28, while arm 39 of the steering crank extends transversely of the vehicle frame and terminates beyond the outer face of rail 10 in a ball and socket joint 40 where it takes the forward end of drag link 41 which extends to steering arm 24.

It will be readily apparent that reciprocation of drag link 41 through actuation of steering gear 22 swings crank 37 in a manner to swing arms 28 about pivot points 29, central rod-section 26 thus being swung transversely of the vehicle frame through a horizontal plane but remaining at all times parallel to cross member 11. The movement of section 26 causes, of course, coincident movement of end sections 27 and the wheels to which they are connected through knuckle arms 21. Fig. 3 clearly shows the relative position of parts when the steering mechanism has been actuated to assume an extreme position.

While the pivotal mountings 29 of arms 28 and the pivotal mounting 38 of steering crank 37 may be of any suitable type, we will describe the illustrated mountings as being particularly well adapted to the purpose. Referring first to Figs. 1 and 9, pivotal mounting 38 will be seen to include a housing 42 secured to rail 10 and cross brace 12 through arms 43. The housing contains spaced bearings 44 whereby a vertical spindle 45 is mounted for free rotation, nut 46 holding the spindle against longitudinal displacement. Crank 37 has tight fit on spindle 45 below housing 42, nut 46a serving as a retainer. It will be noted that crank arm 39 has a U-bend 39a, so it may have ample clearance with respect to the underside of rail 10 and yet bring joint 40 up at the outer side of the rail in a position best to receive the substantially horizontal drag link 41.

Pivotal mountings 29 (Figs. 6 and 10) are generally similar to mounting 38, each mounting 29 including a housing 47 secured by bracket arms 48a to the flanges of cross member 11. In each case, housing 47 supports a vertical spindle 48 through bearings 49, a nut 50 serving to hold the bearing and spindle elements in assembly. Supporting arms 28 are, in effect, transverse extensions of spindles 48, being integral therewith, though this is not essential to the invention. The free ends of arms 28 are preferably forked, the fork arms being indicated at 51. Figure 8 shows an enlarged section through one of the connections between a given arm 28 and tie rod section 26, but this figure may be considered as typical of both pivotal connections 30 and likewise of pivotal connections 35 and 35a. As regards the last two named connections, the fork arms 52 and 52a provided on the opposite ends of connecting rod 34, may be considered the same as fork arms 51, while the extension or tongue 33, where it extends between fork arms 52, and the end of crank arm 36 where it extends between the fork arms 52a may be considered the equivalent of the portions 53 of rod 26 which extend between fork arms 51. Thus, for the purpose of claim terminology, those portions of the several members which extend between the associated fork arms, may be considered as "tongues".

Fork arms 51 have inwardly tapering apertures 54 which register with opposite sides of aperture 55 in tongue 53. Aperture 55 is tapered inwardly from opposite ends, the tapers being continuations of the tapers of apertures 54. A pair of frusto-conical sleeves 56 of resilient material such as hard rubber are thrust into the fork and tongue apertures from opposite sides thereof, a bolt 57 passing through the sleeve bores and, with its head 57a, lock washer 58, and nut 59, serving to hold the joint in assembly. It will be noted that head 57a and washer 58 do not extend radially beyond sleeves 56, so there is no metal-to-metal contact between any joint parts. The opposite tapering of sleeves 56 acts, in effect, to prevent the sleeve assembly from longitudinal displacement with respect to the fork and tongue, so long as said sleeves are held by bolt 57 against individual separative displacement. Thus the fork and tongue are held in connected relationship by fully resilient joints.

The provision of these resilient joints between the tie rod and supporting means therefor, and also between the connecting rod and its point of attachment with the tie rod and steering crank, does much to absorb and damp out vibrations of the dirigible wheels due to road inequalities, and thus prevents such vibrations from following back through the steering crank, drag link and steering gear 22 to the steering post 23. This results not only in reducing to a great extent the strain on the driver, as will be readily understood, but also materially reduces the wear on the steering gear parts.

In Figure 11 we have shown a variational connection between tie rod and connecting rod, all other parts being the same as in the remaining figures. Here, the fork 51' of arm 28' is extended beyond the central section 26' and takes connecting rod 34' at 35'. Consequently reciprocation of rod 34' through actuation of crank 37 swings supporting arm 28' which, in turn, shifts section 26' and its associated elements in the manner set forth above.

While we have described and illustrated a preferred embodiment of our invention, it will be understood that various changes in design, structure and arrangement may be made without departing from the spirit and scope of the appended claims.

We claim:

1. In a vehicle having a frame and a pair of dirigible wheels, steering mechanism embodying a jointed tie rod interconnecting said wheels and shiftable transversely of the frame, said rod including two end sections connected, one each, to said wheels, and a central section between and connected to said end sections, a pair of spaced arms connecting said central section with the frame for swinging movement in a horizontal plane, and a transversely movable steering member connected directly to said tie rod for shifting it transversely of the frame, said member being positioned at the side of said tie rod opposite from said arms.

2. In a vehicle having a frame and a pair of dirigible wheels, steering mechanism embodying a jointed tie rod interconnecting said wheels and shiftable transversely of the frame, said rod including two end sections connected, one each, to said wheels, and a central section between and connected to said end sections, a pair of spaced arms connecting said central section with the frame for swinging movement in a horizontal plane, and a transversely movable steering member connected directly to said central section for shifting the tie rod transversely of the frame, said member being positioned at the side of said tie rod opposite from said arms.

3. In a vehicle having a frame and a pair of dirigible wheels, steering mechanism embodying a jointed tie rod interconnecting said wheels and shiftable transversely of the frame, said rod including two end sections connected, one each, to said wheels, and a central section between and connected to said end sections, a pair of spaced arms connecting said central section with the frame for swinging movement in a horizontal plane, and means connected to said tie rod for shifting it transversely of the frame, said last mentioned means including a steering crank mounted on the side of the frame for horizontal swinging movement, and a rod extending transversely from said crank and connecting directly with said central section.

4. In a vehicle having a frame and a pair of dirigible wheels, steering mechanism embodying a pair of parallel horizontal arms mounted on the frame for swinging movement transversely of the frame, said arms being normally parallel with the longitudinal axis of the frame, a rod extending between and pivotally connected to said arms for movement therewith, said rod extending normally at right angles to said axis, means connecting said rod to said wheels, a steering crank and a connecting rod connecting said first mentioned rod and said crank, said connecting rod normally extending substantially parallel to the first mentioned rod.

5. In a vehicle having a frame comprising a pair of side members, a transverse spring connected to the frame and a pair of dirigible wheels carried on the ends of said spring, steering mechanism embodying a jointed tie rod interconnecting said wheels and shiftable transversely of the frame, said rod including two end sections connected, one each, to said wheels and intersecting the vertical planes of said side members, and a central section between and connected to said end sections at points between and spaced from said side members, horizontal supporting arms at one side of said rod pivotally connecting said frame and said central section, and a transversely movable steering member at the opposite side of said rod and connected directly thereto.

6. In a vehicle having a frame comprising a pair of side members, a transverse spring connected to the frame and a pair of dirigible wheels carried on the ends of said spring, steering mechanism embodying a jointed tie rod interconnecting said wheels and shiftable transversely of the frame, said rod including two end sections connected, one each, to said wheels and intersecting the vertical planes of said side members, and a central section between and connected to said end sections at points between and spaced from said side members, a pair of parallel, horizontal supporting arms normally extending substantially parallel with the longitudinal axis of the frame and pivotally connecting said frame and said central section, a transversely movable steering member mounted on one of said members, and means at the side of said rod opposite said arms connecting said steering member directly with the tie rod.

7. In a vehicle having a frame comprising a pair of side members, and a pair of dirigible wheels, steering mechanism embodying a pair of parallel horizontal arms mounted on the frame between said side members for swinging movement transversely of the frame, said arms being normally parallel with the longitudinal axis of the frame, a rod extending between and pivotally connected to said arms for movement therewith, said rod extending normally at right angles to said axis, means connecting said rod to said wheels, a steering crank mounted on one of the frame side members, and a member extending transversely and rearwardly of the frame from said rod and connecting the rod with said crank.

8. In a vehicle having a frame including a pair of longitudinal side rails, and a pair of dirigible wheels, a jointed tie rod interconnecting said wheels, a horizontally swinging steering arm pivotally mounted on one of said side rails, a pair of transversely spaced arms pivotally connecting said tie rod with the frame, a transversely extending rod connecting said steering arm with the tie rod, a drag link connected to the steering arm, and means applied to the drag link for reciprocating it.

9. In a vehicle having a frame including a pair of longitudinal side rails, and a pair of dirigible wheels, a jointed tie rod interconnecting said wheels, a horizontally swinging bell crank pivotally mounted on one of said side rails and with one of its arms extending beyond the outside of the rail, a pair of transversely spaced arms pivotally connecting said tie rod with the frame, means connecting one of the crank arms with the tie rod, and a drag link connected to the other arm of the crank at the outside of said one frame rail.

OSCAR F. LUNDELIUS.
MELVIN N. LEFLER.